United States Patent [19]
Baker et al.

[11] Patent Number: 5,923,746
[45] Date of Patent: *Jul. 13, 1999

[54] CALL RECORDING SYSTEM AND METHOD FOR USE WITH A TELEPHONIC SWITCH

[75] Inventors: Daniel F. Baker, Rolling Meadows; Noreen A. Harrington, Naperville; Paul E. Van Berkum, Winfield, all of Ill.

[73] Assignee: Rockwell International Corp., Seal Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,510

[22] Filed: Sep. 18, 1996

[51] Int. Cl.$^6$ .......................... H04M 1/24; H04M 11/00; H04M 3/42; H04M 3/00

[52] U.S. Cl. .................. 379/265; 379/34; 379/88.19; 379/201; 379/258; 379/260; 379/265; 379/273; 379/309

[58] Field of Search .................. 379/67, 88, 89, 379/34, 88.19, 201, 273, 309, 265, 258, 260

[56] References Cited

U.S. PATENT DOCUMENTS

| | | | |
|---|---|---|---|
| 4,757,525 | 7/1988 | Matthews et al. | 379/89 |
| 5,168,515 | 12/1992 | Gechter et al. | 379/265 |
| 5,511,112 | 4/1996 | Szlam | 379/88 |
| 5,530,744 | 6/1996 | Charalambous et al. | 379/265 |
| 5,535,256 | 7/1996 | Maloney et al. | 379/34 |
| 5,563,937 | 10/1996 | Bruno et al. | 379/201 |
| 5,568,544 | 10/1996 | Keeler et al. | 379/273 |
| 5,621,789 | 4/1997 | McCalmont et al. | 379/265 |
| 5,703,943 | 12/1997 | Otto | 379/265 |
| 5,742,675 | 4/1998 | Kilander et al. | 379/265 |
| 5,757,904 | 5/1998 | Anderson | 379/265 |

*Primary Examiner*—Fan S. Tsang
*Assistant Examiner*—Allan Hoosain
*Attorney, Agent, or Firm*—Welsh & Katz, Ltd.

[57] ABSTRACT

A call recording system and method records telephone calls routed by a telephonic switch 104 to agents located at computer terminals 108. A call information circuit 110 associated with the telephonic switch 104 detects information, such as DNIS via a DNIS circuit 112 and/or information provided by the caller, relating to the telephone calls. The computer terminal 108 includes a recording device 114 which records the telephone calls based on the call information relating to the calls. The recordings of the calls are stored in a storage device 116. To facilitate later replaying a call, a call sequence indicator 118 attaches a call sequence number to a recording of telephone call. Alternatively, or in addition to, a call time indicator 118 attaches a time and day indicator to the recording based on when the call was received. An automatic recorder 122 automatically records specified telephone calls based on the call information. An overwrite circuit 126 overwrites the call recording in the storage device every time period. A period selector 128 permits the agent, or an administrator, to select the length of the time period.

18 Claims, 2 Drawing Sheets

5,923,746

CALL RECORDING SYSTEM AND METHOD FOR USE WITH A TELEPHONIC SWITCH

BACKGROUND OF THE INVENTION

The present invention relates generally to a call recording system and method for recording telephone calls routed by a telephonic switch to an agent and, more particularly, to a call recording system and method wherein a telephone call is automatically recorded based on call information, wherein the agent may initiate recording at substantially any time during the telephone call and wherein a portion of the telephone call is recorded for a predetermined time period and the recording is continuously overwritten when the predetermined time period expires.

Telephonic switches route telephone calls from external, or internal, callers to agents for service. Many times it is necessary to record the telephone calls. For example, harassing telephone calls may need to be recorded. Further, telephone calls handled by inexperienced agents may need to be recorded for learning purposes.

Prior call recording systems have very limited flexibility. A telephone call is either automatically recorded from the beginning of the call or the agent initiates the recording during the call. These systems have significant drawbacks. For example, only particular calls, such as from or to a certain telephone number, may need to be automatically recorded from the beginning of the call. Further, the recording process may start after the conduct to be recorded occurs if an agent manually initiates the call recording.

Accordingly, there is a need in the art for a call recording system and method wherein a telephone call is automatically recorded based on call information, wherein the agent may initiating recording at substantially any time during the telephone calls and wherein a portion of a telephone call is recorded for a predetermined time period and the recording is continuously overwritten when the predetermined time period expires.

SUMMARY OF THE INVENTION

This need is satisfied by a call recording system and method in accordance with the present invention wherein a telephone call is routed to an agent at a computer terminal, the telephone call is recorded automatically based on call information relating to the telephone call, the agent may initiate recording of the telephone call at any time and a portion of the telephone call is recorded for a predetermined time period and the recording is continuously overwritten when the predetermined time period expires.

In accordance with one aspect of the present invention, a call recording system records a telephone call routed from a telephonic switch to an agent. The call recording system comprises a call information circuit for detecting call information relating to the telephone call, such as DNIS information, caller provided information or ANI information, and a recording device for recording the telephone call based on the call information. A storage device stores the recording of the telephone call.

To easily retrieve individual recorded calls, a call sequence indicator assigns a call sequence number to the telephone call indicative of the order in which the agent received the call. This call sequence number is then provided to the storage device for storage with the recording of the telephone call. Thereafter, calls may be retrieved based on a particular call sequence number. To further identify and locate individual telephone calls, a call time indicator indicates a time of day when each telephone call is received by the agent. The time of day is stored in the storage device with the recording of the telephone calls.

Preferably, an automatic recorder automatically records each telephone call upon receipt of the telephone calls by the agent. The recording device may comprise an overwrite circuit for recording a predetermined time period of the telephone call and for continuously overwriting the recording when the predetermined time period has expired. The recording device may further comprise a period selector for defining the predetermined time period for which the telephone call is recorded.

In accordance with another aspect of the present invention, a method for recording a telephone call routed from a telephonic switch to an agent is provided. The method comprises the steps of: receiving the telephone call by the agent from the telephonic switch; detecting call information relating to the telephone call; and recording the telephone call based on the call information. Preferably, the method comprises one or both of the steps of detecting dialed number identification service information relating to the telephone call and detecting call information provided by a caller of the telephone call.

These and other features and advantages of the present invention will become apparent from the following detailed description, the accompanying drawings and the appended claims.

DETAILED DESCRIPTION OF THE INVENTION

Figure 1:
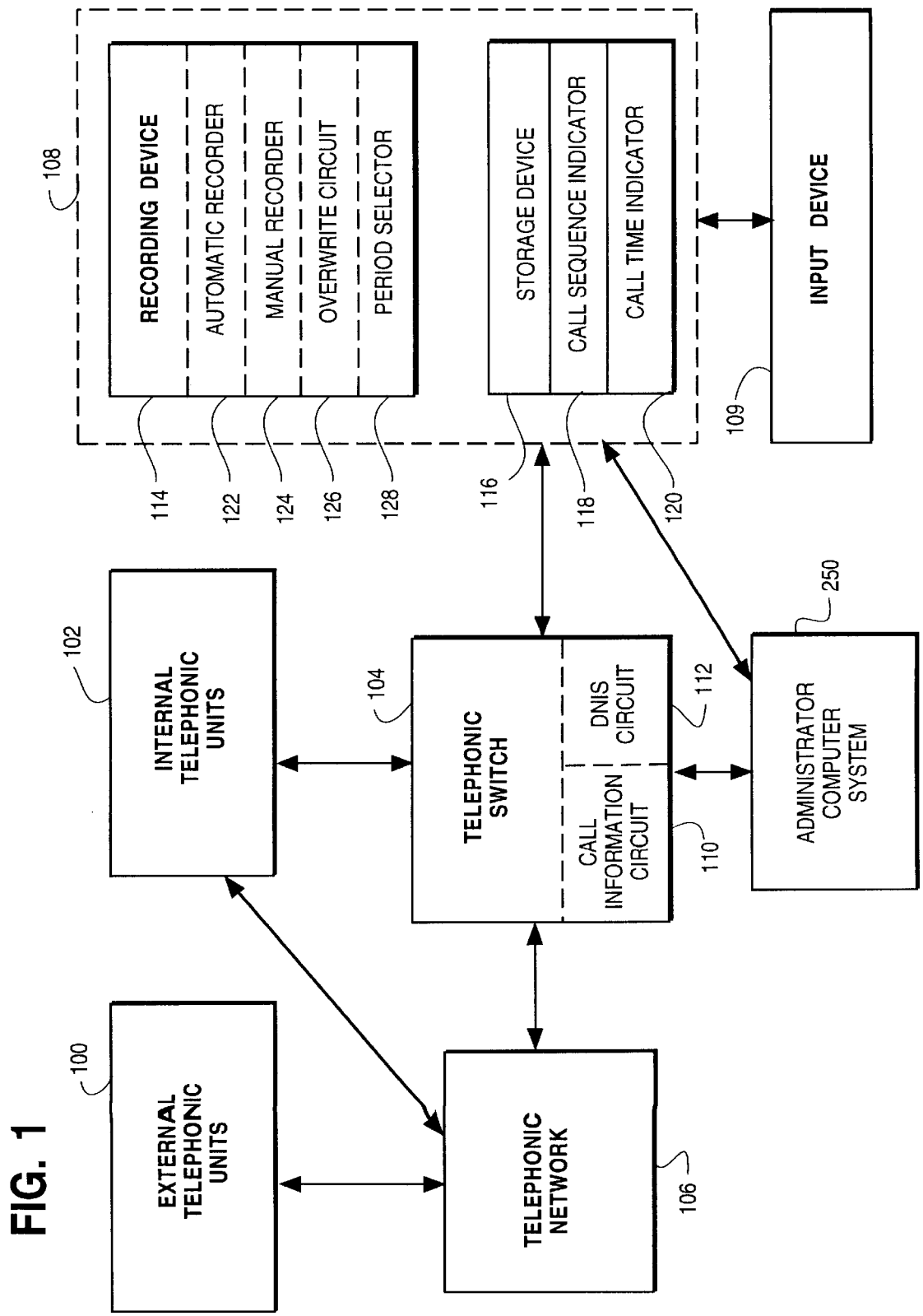
FIG. 1 is a block diagram of a call recording system in accordance with the present invention.

A call recording system is shown in FIG. 1 in accordance with the present invention wherein telephone calls received from either external telephonic units 100 or internal telephonic units 102 may be recorded. Telephone calls from the external telephonic units 100 are transmitted to a telephonic switch 104, such as an automatic call distributor (ACD), via a telephonic network 106 in a well known manner. Telephone calls from the internal telephonic units 102 may or may not be routed to the telephonic switch 104 through the external telephonic network 106. For purposes of this specification, the internal telephonic units 102 are units which are dedicated to the telephonic switch 104, such as agent telephones, supervisor telephones and the like. The internal telephonic units 102 may be hardwired to the telephonic switch 104 or they may be connected to the switch 104 over a network, such as a large area network (LAN) or the external telephonic network 106. Numerous ACDs are known in the art for routing telephone calls. Such ACDs are described in commonly assigned U.S. Pat. No. 5,386,412 issued on Jan. 31, 1995 to Park et al., entitled "Telecommunications System Protocol For Asynchronous Data Communication Between Multiport Switch Control Processor And Information Support Personal Computer Terminal" and commonly assigned U.S. Pat. No. 5,384,841 issued on Jan. 24, 1996 to Adams et al., entitled "Automatic Call Distribution Network With Call Overload System and Method", the disclosures of which are hereby incorporated by reference.

A call information circuit 110 collects call information relating to the telephone calls being received by the telephonic switch 104. For example, a dialed number identification service (DNIS) circuit 112 detects DNIS numbers transmitted with the telephone calls. Further, call information may be contained in ANI information. In addition, call information may be provided by callers of the telephone call by entering the appropriate numbers on the external telephonic unit 100. A number of methods for detecting and obtaining call information are known in the art. Since the structure and philosophy of these methods are not important to the present invention beyond generating and detecting call information, details of such methods will not be further disclosed herein.

The telephonic switch 104 routes the received telephone calls to agents positioned at agent terminals. The agent terminals comprise a computer terminal 108 and an input device 109, such as a keyboard or mouse. The agents also have access to audio transmission devices for receiving the audio portion of the telephone call, such as a telephone console, as discussed below with respect to FIG. 2.

In accordance with the present invention, the computer terminal 108 comprises a recording device 114 for recording a telephone call based on the call information detected by the call information circuit 110. The recording of the telephone call is stored, either as its being recorded or afterwards, in a storage device 116. The computer terminal 108 may comprise a call sequence indicator 118 for assigning a call sequence number to the telephone call indicative of the order in which the agent received the call. The call sequence indicator 118 may also provide the call sequence number to the storage device 116 for storage with the recording of the telephone call. In addition, the computer terminal 108 may include a call time indicator 120 for indicating a time of day when the telephone call is received by the agent and for providing the time of day to the storage device 116 for storage with the recording of the telephone call. By using the call sequence number and/or the call time, an individual may later retrieve a specific recording.

As noted previously, it may be advantageous to record some telephone calls from their inception. An automatic recorder 122 in the recording device 114 automatically records the telephone call upon receipt of the telephone call by the agent. This automatic recording feature may be activated based on predetermined DNIS numbers, a preselected time of day, a particular agent, or any other characteristic of the telephone call. A manual recorder 124 further provides the capability for an agent to initiate the recording of the telephone call at substantially any time during the telephone call.

In order to decrease the likelihood that the recording device 114 may begin recording after an action to be recorded occurs, such as a threat, the recording device 114 comprises an overwrite circuit 126 for recording a predetermined time period of the telephone call and for continuously overwriting the recording when the predetermined time period has expired. For example, the predetermined time period may be selected to be five minutes. The agent, or a system administrator, selects the predetermined time period via a period selector 128.

The recording device 114 begins recording the telephone call upon receipt of the call, or upon initiation by the agent. The call is thereafter continuously recorded for five minutes and stored in the storage device 116. After five minutes, the overwrite circuit 126 begins to overwrite the previous five minutes of the recording. This continues for the duration of the telephone call such that the last five minutes of the telephone call is always stored in the storage device 116. If the agent wishes to continuously record the telephone call, the agent signals the recording device 114, or more particularly the manual recorder 124, via the input device 109. The recording device 114 then begins to continually record the telephone call and appends the continuous recording to the previously recorded five minutes. After the completion of the telephone call, the storage device 116 contains a five minute portion of the telephone call immediately preceding the request to continually record and a continuous recording of the telephone call subsequent to the request to continually record.

Figure 2:
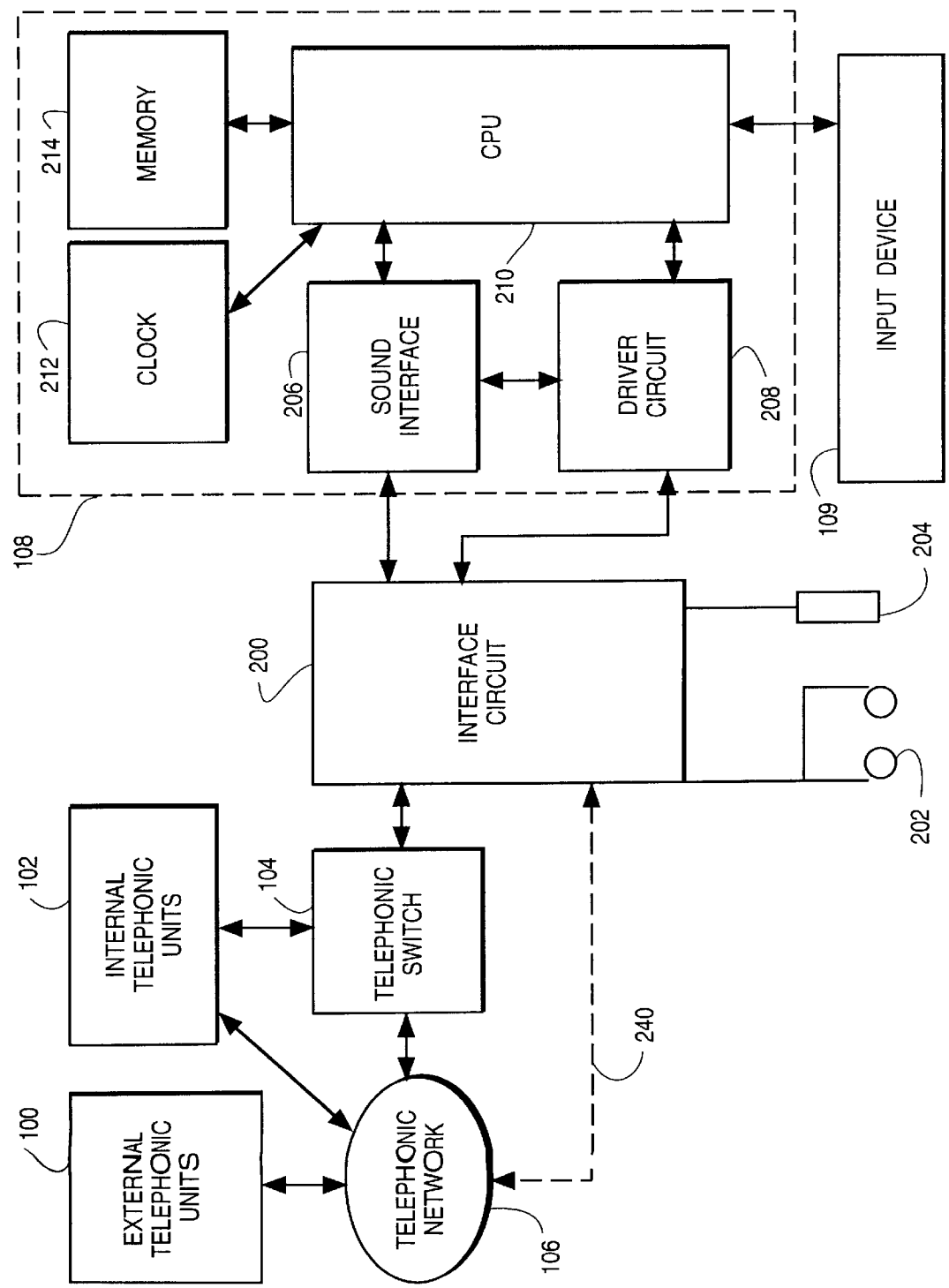
FIG. 2 is a schematic block diagram of the call recording system shown in FIG. 1 depicting an exemplary hardware configuration for implementing the call recording system and method of the present invention.

An exemplary hardware configuration for implementing the present invention is shown in FIG. 2. An interface circuit 200 receives the telephone call from the telephonic switch 104. As shown by dotted line 240, the telephone call may be routed by the telephonic switch 104 through the telephonic network 106, or other communications networks, such as a local area network and the like, to the interface circuit 200. By sending the routed telephone call through the telephonic network 106, the agent, or the computer terminal 108, may be located miles from the telephonic switch.

The interface circuit 200 includes a loudspeaker, such as headphones 202, through which the agent listens to the caller. The agent communicates to the caller through a microphone 204 connected to the interface circuit 200. The interface circuit 200 also passes the telephone call to the computer terminal 108. A sound interface 206 and a driver circuit 208 receive/transmit signals from/to the interface circuit 200. A central processing unit (CPU) 210 controls the operation of the sound interface 206 and the driver circuit 208 by executing the appropriate software programs.

In particular, the driver circuit 208 indicates to the CPU 210 and the sound interface 206 that the telephone call has been received. The CPU 210, in conjunction with the sound interface 206, records the telephone call and stores the recording in a memory 214. When the telephone call is terminated, the driver circuit 208 is notified by the interface circuit 200 and the call recording is stopped.

In accordance with another aspect of the present invention, a method for recording a telephone call routed from the telephonic switch 104 to an agent is provided. The agent receives the telephone call from the telephonic switch 104. The call information circuit 110 detects call information relating to the telephone call. The DNIS circuit 112 may detect DNIS information relating to the telephone call. Further, the caller may be prompted to provide call information. Based on the call information, the recording device 114 records the telephone call. A system administrator typically selects which calls are to be automatically recorded through an administrator computer system 250.

Preferably, the recording of the telephone call is stored in the storage device 116. The recording device 114 may automatically record the telephone call upon receipt of the telephone call by the agent. The recording device 114 may operate by recording a portion of the recording of the telephone call for a predetermined time period and overwriting the portion of the recording of the telephone call with a subsequent portion of the telephone call. Preferably, the period selector 128 permits the variation of the time period for which the portions of the telephone call are recorded.

The structure, control and arrangement of the software components and circuits have, for the most part, been illustrated in the drawings by readily understandable block representations and schematic diagrams. The drawings are intended to show those specific details that are pertinent to the present invention, in order not to obscure the disclosure with structural details which will be readily apparent to those skilled in the art having the benefit of the description herein.

Having thus described the invention in detail by way of reference to preferred versions thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A call recording system of an automatic call distributor for recording a telephone call received from a public switch telephone network and routed from a telephonic switch of the automatic call distributor to a terminal of an agent comprising:

an administrator computer system which selects calls to be recorded;

a call information circuit which receives call information through the automatic call distributor from the public switch telephone network, the received call information relating to the telephone call; and a recording device which records the telephone call based upon the received call information, when the received call information substantially matches that of the selected calls, and wherein the agent may otherwise initiate recording at substantially any time during the telephone call and wherein a portion of the telephone call is recorded for a predetermined time period and the recording is continuously overwritten when the predetermined time period expires.

2. The call recording system as recited in claim 1 comprising:

a storage device for storing the recording of the telephone call.

3. The call recording system as recited in claim 2 comprising:

a call sequence indicator for assigning a call sequence number to the telephone call indicative of the order in which the agent received the call and for providing the call sequence number to the storage device for storage with the recording of the telephone call.

4. The call recording system as recited in claim 2 comprising:

a call time indicator for indicating a time of day when the telephone call is received by the agent and for providing the time of day to the storage device for storage with the recording of the telephone call.

5. The call recording system as recited in claim 1 wherein the recording device comprises an automatic recorder for automatically recording the telephone call upon receipt of the telephone call by the agent.

6. The call recording system as recited in claim 1 wherein the call information circuit comprises:

a dialed number identification service circuit for detecting dialed number identification service information relating to the telephone call, and wherein the recording circuit automatically records the telephone call based on the detected dialed number identification service information.

7. The call recording system as recited in claim 1 wherein the recording device comprises:

an overwrite circuit for recording a predetermined time period of the telephone call and for continuously overwriting the recording when the predetermined time period has expired.

8. The call recording system as recited in claim 7 wherein the recording device comprises:

a period selector for defining the predetermined time period for which the telephone call is recorded.

9. The call recording system as recited in claim 7 wherein the recording device comprises:

a manual recorder for receiving instructions from the agent to begin continually recording the telephone call and for appending the continuous recording to the recording for the predetermined time period.

10. A method for recording a telephone call from a public switch telephone network and routed from a telephonic switch of an automatic call distributor to a terminal of an agent, such method comprising the steps of:

selecting which calls are to be recorded;

receiving the telephone call through the automatic call distributor by the terminal of the agent from the telephonic switch;

receiving call information from the public switch telephone network, the received call information being of the telephone call; and recording the telephone call based on the call information, when the received call information substantially matches call information of the selected calls, and wherein the agent may otherwise initiate recording at substantially any time during the telephone call and wherein a portion of the telephone call is recorded for a predetermined time period and the recording is continuously overwritten when the predetermined time period expires.

11. The method as recited in claim 10 comprising:

storing the recording in a storage device.

12. The method as recited in claim 10 wherein the step of recording comprises the step of:

automatically recording the telephone call upon receipt of the telephone call by the agent.

13. The method as recited in claim 10 wherein the step of detecting comprises the step of:

detecting dialed number identification service information relating to the telephone call.

14. The method as recited in claim 10 wherein the step of detecting comprises the step of:

detecting call information provided by a caller of the telephone call.

15. The method as recited in claim 10 wherein the step of recording comprises the steps of:

recording a portion of the recording of the telephone call for a predetermined time period; and overwriting the portion of the recording of the telephone call with a subsequent portion of the telephone call.

16. The method as recited in claim 15 wherein the step of recording comprises the step of:

selecting a length of the predetermined time period.

17. The method as recited in claim 16 wherein the step of detecting call information comprises the step of:

detecting dialed number identification service information.

18. The method as recited in claim 16 wherein the step of detecting call information comprises the step of:

detecting call information provided by a caller of the telephone call.

* * * * *